ional Patent [19] [11] 4,423,990
Kodama et al. [45] Jan. 3, 1984

[54] CRANKSHAFT MILLING MACHINE

[75] Inventors: Kazuo Kodama; Yoshihiro Tsukiji, both of Komatsu, Japan

[73] Assignee: Kabushiki Kaisha Komatsu Seisakusho, Tokyo, Japan

[21] Appl. No.: 132,086

[22] Filed: Mar. 20, 1980

[30] Foreign Application Priority Data

Mar. 30, 1979 [JP] Japan .................................. 54-37027

[51] Int. Cl.³ .......................... B23B 5/18; B23C 3/06
[52] U.S. Cl. .............................. 409/132; 51/105 SP;
51/289 R; 51/326; 82/1 C; 82/9; 409/199;
409/203
[58] Field of Search ............... 409/197, 199, 203, 132;
82/9, 3, 1 C; 51/105 SP, 289 R, 326

[56] References Cited

U.S. PATENT DOCUMENTS

| 1,168,162 | 1/1916 | Chernack | 82/3 |
| 2,138,522 | 11/1938 | Groene et al. | 82/9 X |
| 2,611,290 | 9/1952 | Bullard | 82/3 |
| 4,044,638 | 8/1977 | Heffron et al. | 82/9 |
| 4,116,111 | 9/1978 | Schmid | 51/105 SP X |

Primary Examiner—Z. R. Bilinsky
Attorney, Agent, or Firm—Armstrong, Nikaido, Marmelstein & Kubovcik

[57] ABSTRACT

A crankshaft milling machine comprising a bed, guide rails carried by the bed, a milling unit having a pair of arbor slidably mounted on the guide rails, the milling unit being adapted to move back and forth along the guide rails, a pair of headstocks mounted on the bed each having a spindle mounted therein, a pair of chucks each mounted on the respective spindles for clamping a workpiece to be milled, and a center stock mounted on the bed for supporting one end of the workpiece.

4 Claims, 1 Drawing Figure

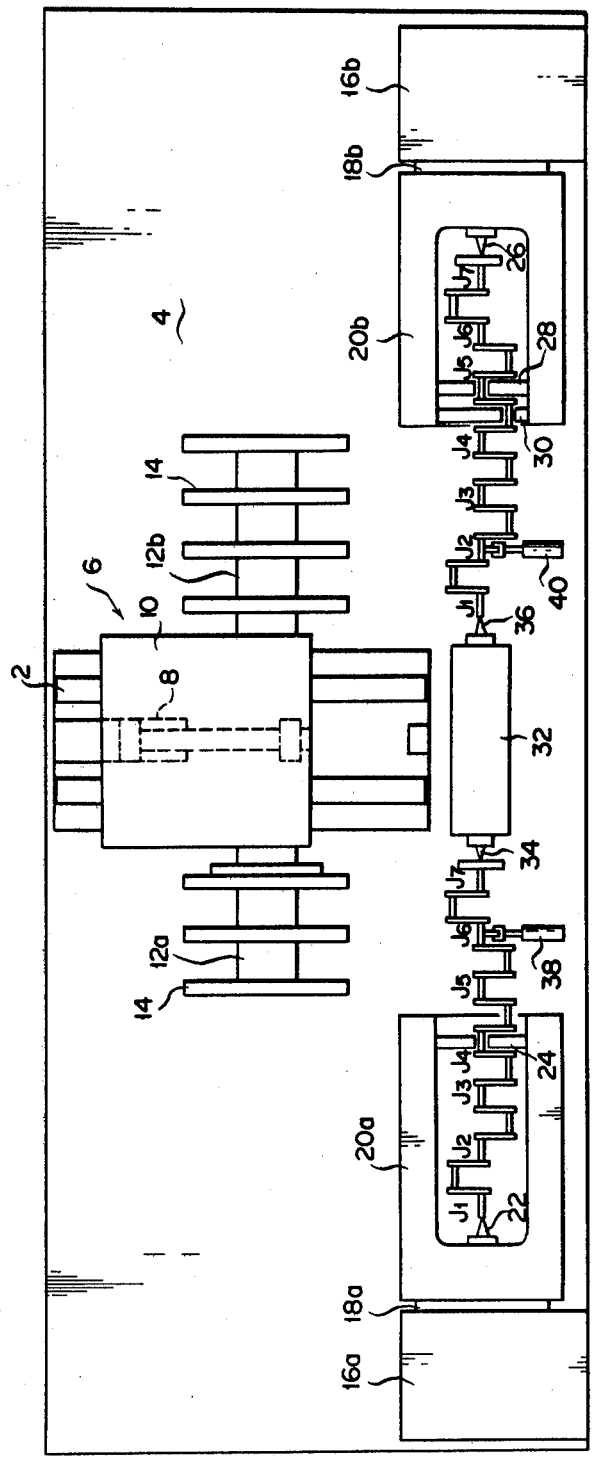

CRANKSHAFT MILLING MACHINE

BACKGROUND OF THE INVENTION

This invention relates to a crankshaft milling machine and in particular to a milling machine for milling main bearings of a crankshaft.

Such a crankshaft milling machine has a bed on which two chucks are supported to hold both ends of a crankshaft to be milled. A milling unit carrying a plurality of milling cutters is movable back and forth on guide means on the machine bed toward and away from the crankshaft to be milled. Crankshaft milling machines of the type specified operate in such a manner that after inserting a crankshaft to be milled into the chucks from above, the crankshaft is aligned by means of adjustable centers which also position the crankshaft axially. Hydraulically actuated jaws, which engage flats on the surface of the outermost crank web, determine the angular position of the shaft. After centering and aligning the hydraulically actuated jaws clamp the shaft at both ends thereof.

With the crankshaft being clamped, the milling unit is advanced toward the crankshaft in a so-called immersion movement until the milling cutters reach the outer periphery of main bearings of the crankshaft. At this point the milling unit is stopped and then the crankshaft is rotated with its chucks while the milling discs are rotated as well. Thus, the milling of the main bearing surfaces of the crankshaft is completed when the crankshaft has made one full revolution.

The conventional crankshaft milling machine specified above generally requires preliminary machining to both ends of the crankshaft which are to be clamped by the chucks and to a counterweight to be supported by rest means, which attributes to increased machining steps for preliminary workings.

SUMMARY OF THE INVENTION

It is therefore an object of the present invention to provide a crankshaft milling machine wherein all main bearing portions of a crankshaft can be milled with only centering machining to both ends of a crankshaft for preliminary workings.

Another object of the present invention is to provide a crankshaft milling machine which is capable of milling a crankshaft in two steps by clamping center portion of the crankshaft during milling operations.

A further object of the present invention is to provide a crankshaft milling machine which is capable of milling a low rigidity crankshaft with causing a minimum vibration.

According to an aspect of the present invention, there is provided a crankshaft milling machine, comprising: a bed; guide means carried by said bed; a milling unit slidably mounted on said guide means; first drive means operatively connected to said milling unit for advancing said milling unit back and forth along said guide means, said milling unit including an arbor mounting means and a pair of arbor means mounted to said arbor mounting means in alignment with each other, each of said arbor means having at least one disc cutter mounted thereon; second drive means for driving said arbor means; a pair of headstock means mounted on said bed, each of said headstock means having a spindle mounted therein; a pair of chuck means each mounted on said respective spindles for clamping a workpiece to be milled; and center stock means mounted on said bed for supporting one end of the workpiece to be milled.

The above and other objects, features and advantages of the present invention will be readily apparent from the following description taken in conjunction with the accompanying drawing.

BRIEF DESCRIPTION OF THE DRAWING

The accompanying drawing is a schematic representation of a top plan view of a crankshaft milling machine according to the present invention.

DETAILED DESCRIPTION OF THE PREFERRED EMBODIMENT

The present invention will now be described in detail with reference to the accompanying drawing. In the drawing, reference numeral 2 denotes guide rail means fixedly secured to a bed 4 of a crankshaft milling machine. Milling unit 6 is carried by the guide rail means 2 and is moved back and forth thereon by the operation of cylinder means 8 which may be hydraulically actuated. The milling unit 6 includes an arbor mounting 10 and a pair of arbors 12a and 12b mounted to the arbor mounting 10 in alignment with each other. The arbors 12a and 12b are driven by a drive motor (not shown) and has mounted thereon a plurality of milling discs 14. The number of milling discs 14 is not limited but will be determined for the efficiency and convenience of the milling operation. Most conveniently, the number of milling discs 14 will depend on the number of main bearings of the crankshaft to be milled.

Although not specifically illustrated in the drawing, the milling unit 6 also has lock means for locking itself after being advanced by the cylinder means 8.

Mounted on the front side of the bed 4 are pair of headstocks 16a and 16b, one of which may be slidable on the bed 4 or both of which may be fixedly mounted on the bed 4. Headstocks 16a and 16b have mounted therein work spindles 18a and 18b to which chucks 20a and 20b are fixedly secured, respectively.

The left side chuck 20a has mounted therein a center 22 and clamping jaws 24 while the right side chuck 20b has mounted therein a center 26 and clamping jaws 28 and 30. Both centers 22 and 26 may be adjustable by means of hydraulic cylinders not shown.

Mounted on the bed 4 between the headstocks 16a and 16b and in a direction at right angles with the advancing direction of the milling unit 6 is a center stock 32. The center stock 32 may be fixedly mounted on the bed 4 or slidable thereon in a direction at right angles with the advancing direction of the milling unit 6 in order to facilitate a crankshaft mounting to the milling machine. The center stock 32 has mounted therein centers 34 and 36 which may be adjustable by hydraulic cylinder means not shown. Reference numerals 38 and 40 denote rest means for supporting the crankshaft to be milled.

In operation, the crankshaft to be milled is preliminary worked by a centering machine or the like to effect centering at both ends thereof and then inserted into the chuck 20a and is supported at both ends thereof by the hydraulically actuated centers 22 and 34.

The illustrated crankshaft has seven main bearings or journal portions $J_1$ to $J_7$ and the centrally located main bearing $J_4$ is clamped by the clamping jaws 24.

The milling unit 6 is then advanced by operating the cylinder means 8 so that the milling discs 14 on the left side arbor 12a contact with the main bearing surfaces $J_5$ to $J_7$ protruding from the left hand chuck 20a. The arbor 12a is then driven so as to effect the milling operation while the crankshaft is rotated with the chuck 20a.

With one full rotation of the crankshaft, milling of the main bearings $J_5$ to $J_7$ has been completed. The milling unit 6 is then retracted and the crankshaft is taken out of the left side chuck 20a and inserted into the right side chuck 20b where it is supported at both ends thereof by the centers 26 and 36. After holding the crankshaft by both centers 26 and 36, the crankshaft is clamped by the clamping jaws 28 and 30 at the worked main bearing $J_5$ and an adjacent crank bearing or pin portion of the crankshaft which is centerwardly located with respect to the main bearing $J_5$. If the clamping of the main bearing $J_5$ with the jaws 28 is stable enough to hold the crankshaft in position, the clamping of the pin portion with the clamping jaws 30 is not necessary.

The milling unit 6 is again advanced so that the milling discs 14 on the right side arbor 12b contact with the main bearing surfaces $J_1$ to $J_4$ protruding from the right hand chuck 20b. The arbor 12b is then driven so as to effect the milling operation while the crankshaft is rotated with the chuck 20b.

With one full revolution of the crankshaft, the milling of the remaining main bearings $J_1$ to $J_4$ has been completed.

Accordingly, with simple two-step milling operations, the milling of the main bearing portions of the crankshaft can be completed. It will be appreciated that the right and left sides milling operations can be effected simultaneously. Although the invention has been described with reference to the specific embodiment, it will be appreciated that it is intended to cover all modifications and equivalents within the scope of the appended claims.

What we claim is:

1. A crankshaft milling machine for simultaneously milling two workpieces, comprising:
a bed;
guide means carried by said bed;
a milling unit slidably mounted on said guide means,
said milling unit including an arbor mounting means and a pair of arbor means mounted to said arbor mounting means on opposite sides in alignment with each other, each of said arbor means having at least one disc cutter mounted thereon;
first drive means operatively connected to said milling unit for advancing said milling unit back and forth along said guide means;
second drive means for driving said pair of arbor means;
a pair of headstock means mounted on said bed along a line perpendicular to the direction of advancing of said milling unit, each of said headstock means having a spindle mounted therein;
a pair of chuck means each mounted on said respective spindles for clamping a workpiece to be milled; and
center stock means mounted on said bed on said line positioned between said pair of head stock means for supporting one end of each of the workpieces to be simultaneously milled.

2. A crankshaft milling machine as recited in claim 1 wherein said center stock means includes two centers mounted on opposite sides therein each being adapted to support one end of one of the workpieces and wherein each of said chuck means has a center mounted therein for supporting the other end of the workpiece.

3. A crankshaft milling machine as recited in claim 1 or 2 wherein the total number of disc cutters mounted on said pair of arbor means corresponds to the number of main bearings of a crankshaft to be milled.

4. A process for milling a crankshaft by using a crankshaft milling machine including a pair of headstocks each having a chuck means rotatably mounted therein, a center stock, and a milling unit including an arbor mounting means, and a pair of arbor means mounted to and projecting from said arbor mounting means, each of said arbor means having a plurality of disk cutters, total number of which corresponds to the number of main bearings of the crankshaft to be milled, said pair of headstocks and said center stock being aligned along a line; said process comprising the steps of:

(a) clamping the crankshaft by one of said chuck means while supporting opposite ends thereof by said one chuck means and said center stock;

(b) simultaneously milling a plurality of main bearings of the crankshaft which are projecting from said one chuck means by the disk cutters mounted on one of said arbor means while driving the crankshaft by said one chuck means;

(c) unclamping the crankshaft from said one chuck means upon completion of the milling of the step (b);

(d) clamping the crankshaft by the other chuck means while supporting opposite ends thereof by the other chuck means and said center stock; and (e) simultaneously milling a plurality of remaining unmilled main bearings of the crankshaft which are projecting from said other chuck means by the disk cutters mounted on the other arbor means while driving the crankshaft by said other chuck means.

* * * * *